United States Patent

Lelong

[11] Patent Number: 5,934,565
[45] Date of Patent: Aug. 10, 1999

[54] WASHER JET NOZZLE FOR A VEHICLE

[75] Inventor: Reynald Lelong, Saint Mammes, France

[73] Assignee: Societe D'Etudes et Realisations Industrielles et Commerciales -SERIC-, Le Chatelet-En-Brie, France

[21] Appl. No.: 08/620,577

[22] Filed: Mar. 22, 1996

[30] Foreign Application Priority Data

Mar. 22, 1995 [FR] France .................................. 95 03354

[51] Int. Cl.⁶ .................................................. B60S 1/46
[52] U.S. Cl. ...................................... 239/284.1; 239/553
[58] Field of Search ............................ 239/284.1, 284.2, 239/553, 590, 552, 548–553.5, 590.5

[56] References Cited

U.S. PATENT DOCUMENTS

| | | | |
|---|---|---|---|
| 1,649,698 | 11/1927 | Hyde | 239/590 |
| 1,721,237 | 7/1929 | Todd et al. | 239/553 X |
| 2,622,929 | 12/1952 | Neufeld | 239/284.1 |
| 2,772,115 | 11/1956 | Stanley | 239/284.1 |
| 2,793,701 | 3/1957 | Scott et al. | 239/553 X |
| 2,964,248 | 12/1960 | O'Brien | 239/597 X |
| 4,212,425 | 7/1980 | Schlick | 239/284.1 X |
| 4,221,271 | 9/1980 | Barker | 239/553.5 X |
| 5,518,182 | 5/1996 | Sasao | 239/590.5 X |

FOREIGN PATENT DOCUMENTS

| | | | |
|---|---|---|---|
| 2233832 | 12/1973 | France | 239/284.1 |
| 1099877 | 10/1959 | Germany | 239/284.1 |
| 1525608 | 5/1966 | Germany | 239/550 |
| 1071420 | 6/1967 | United Kingdom | 239/284.1 |

*Primary Examiner*—Kevin Weldon
*Attorney, Agent, or Firm*—Young & Thompson

[57] ABSTRACT

A nozzle for dispensing a liquid jet, in particular for washing vehicle windscreens or headlight fronts. The nozzle includes a feed duct and at least two outlets each communicating with the feed duct via a respective communication hole. At least one of the outlet ducts is inclined relative to the feed duct, and each of the feed duct and the outlet ducts is substantially rectilinear. The nozzle further comprises a partition occupying at least a portion of the feed duct adjacent to the outlet ducts so as to subdivide the feed duct into compartments each of which communicates with a respective communication hole. The partition has the function of preventing non-uniform transit of the liquid into the outlet ducts.

8 Claims, 3 Drawing Sheets

WASHER JET NOZZLE FOR A VEHICLE

FIELD OF THE INVENTION

The invention relates to a nozzle for dispensing a liquid jet, in particular for washing a vehicle windscreen or the fronts of its headlights.

In general, such a nozzle serves to place washing liquid on the windscreen in pre-established zones thereof.

BACKGROUND OF THE INVENTION

Prior art nozzles comprise a feed duct and at least one outlet duct communicating with the feed duct via a communication hole. At least one of the outlet ducts is inclined relative to the feed duct, with the outlet duct(s) and the feed duct each being substantially rectilinear.

However, that configuration does not enable the liquid to be dispensed very accurately and thus opposes little resistance to the jet breaking up whenever vehicle speed increases.

Also, that configuration implies turbulence in the communication holes.

As a result, windscreen washing is not very effective.

OBJECTS AND SUMMARY OF THE INVENTION

The invention therefore seeks to mitigate those drawbacks.

Thus, the invention proposes a nozzle of the above-specified type, wherein the nozzle further comprises a partition occupying at least a portion of the feed duct adjacent to the outlet ducts so as to subdivide the feed duct into compartments each of which communicates with a respective communication hole.

The partition has the function of preventing nonuniform transit of the liquid into the outlet ducts. It serves to stabilize the liquid and to concentrate it highly in the outlet ducts and in the outlets therefrom.

This imparts considerable resistance to the jet breaking up, which resistance increases with speed.

The invention thus enables liquid to be distributed very accurately over the required zones, and consequently makes washing highly effective, whatever the speed of the vehicle.

In addition, the nozzle of the invention is entirely suitable for highly streamlined vehicles and it is easy to make.

BRIEF DESCRIPTION OF THE DRAWINGS

Other features of the invention appear from the following description made with reference to the accompanying drawings, given as non-limiting examples.

MORE DETAILED DESCRIPTION

Figure 1:
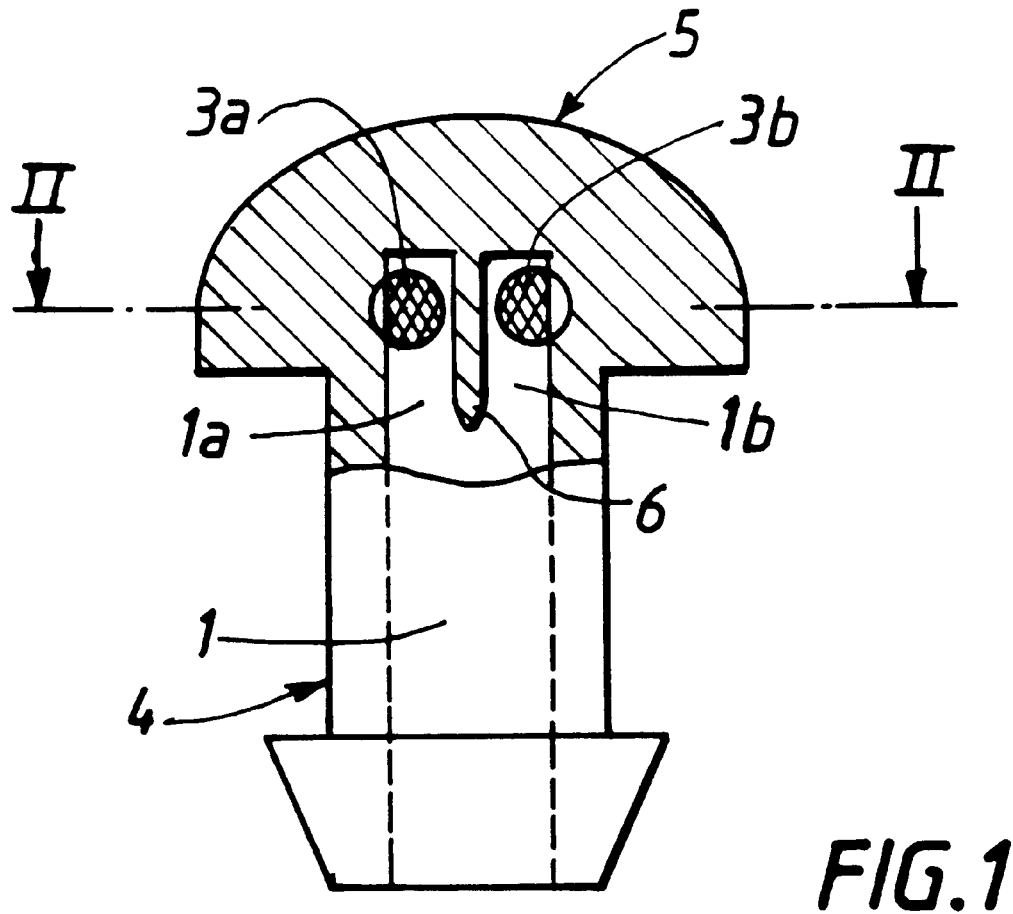
FIG. 1 is a diagrammatic view partially in section of a washer jet nozzle of the invention.
Figure 2:
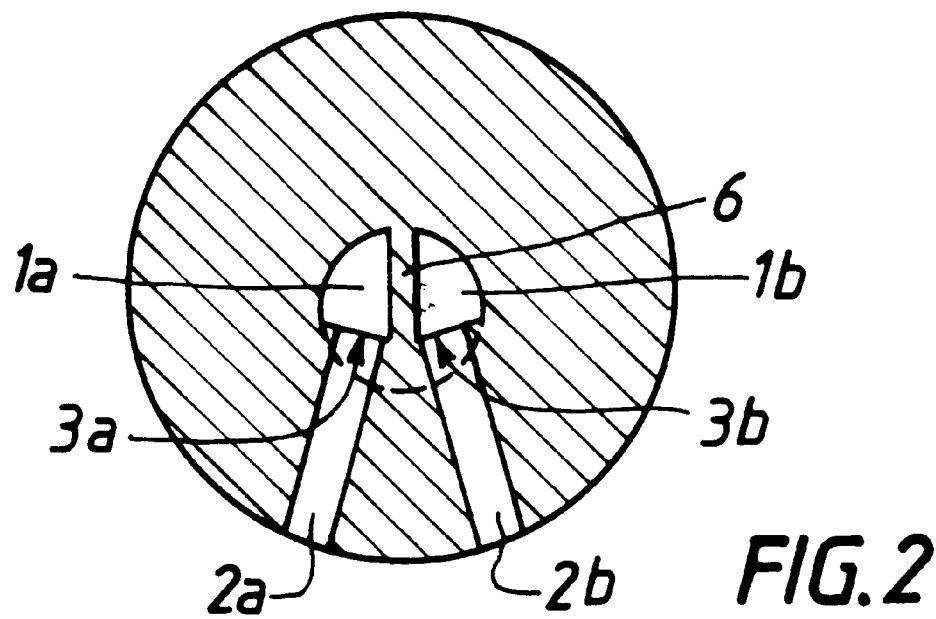
FIG. 2 is a cross-section view on II—II of FIG. 1.

As shown in FIGS. 1 and 2, the washer jet nozzle of the invention includes a feed duct 1 and at least two outlet ducts 2a and 2b each communicating with the feed duct 1 via a respective communication hole 3a or 3b.

The nozzle preferably has two outlet; ducts 2a and 2b which are inclined relative to the feed duct 1.

Naturally, it is possible for only one of the outlet ducts 2a and 2b to be inclined relative to the feed duct 1.

Each duct 1, 2a, and 2b is substantially rectilinear.

In general, the nozzle is substantially in the form of a mushroom, having a stem 4 and a cap 5, the stem 4 includes the feed duct 1 while the cap 5 includes the outlet ducts 2a and 2b.

Figure 3:
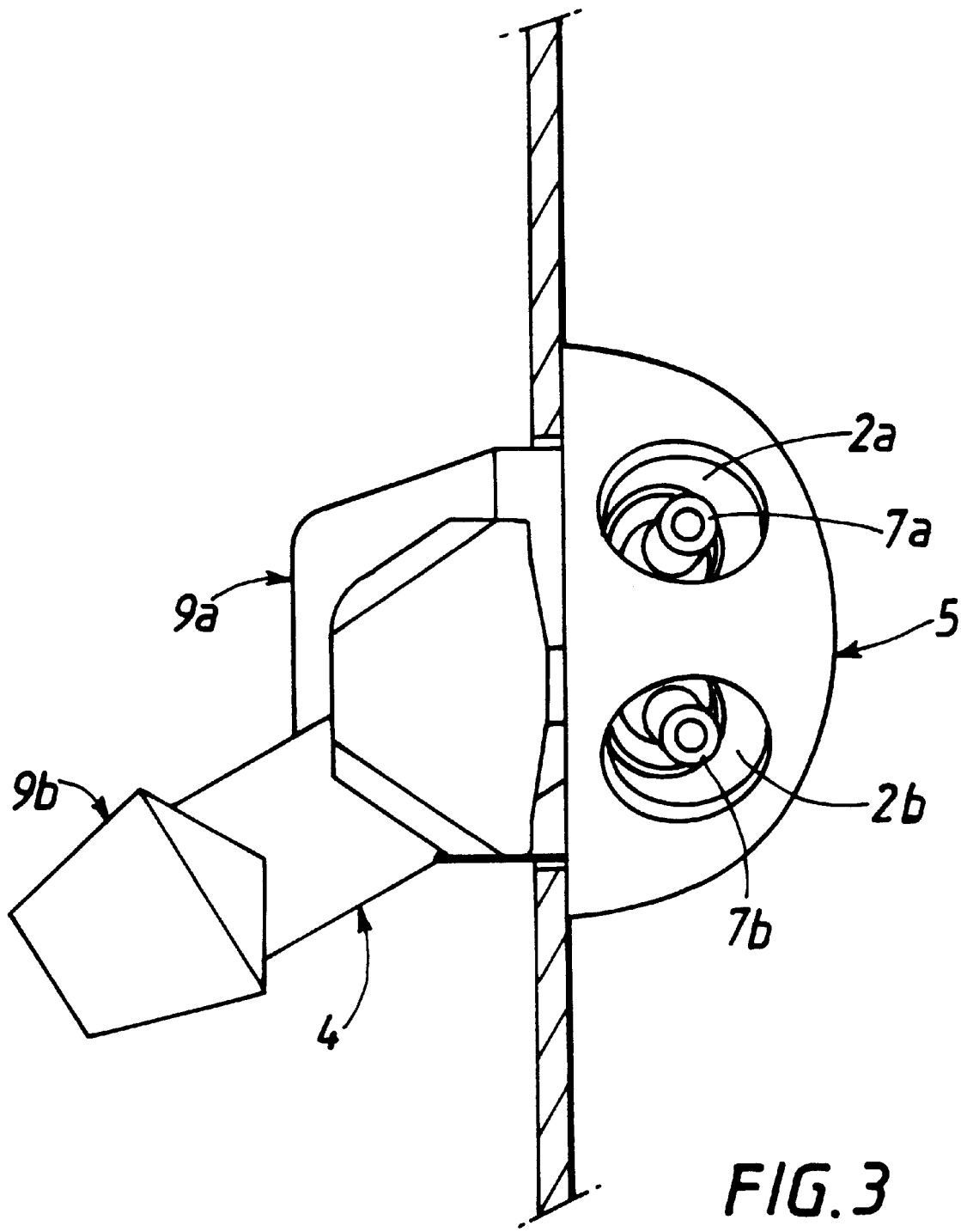
FIG. 3 is a diagrammatic face view in perspective of a nozzle of the invention once installed.

As shown in FIG. 3, the stem 4 of the nozzle may be inclined relative to its cap 5.

The nozzle is preferably made of plastics material.

Figure 4:
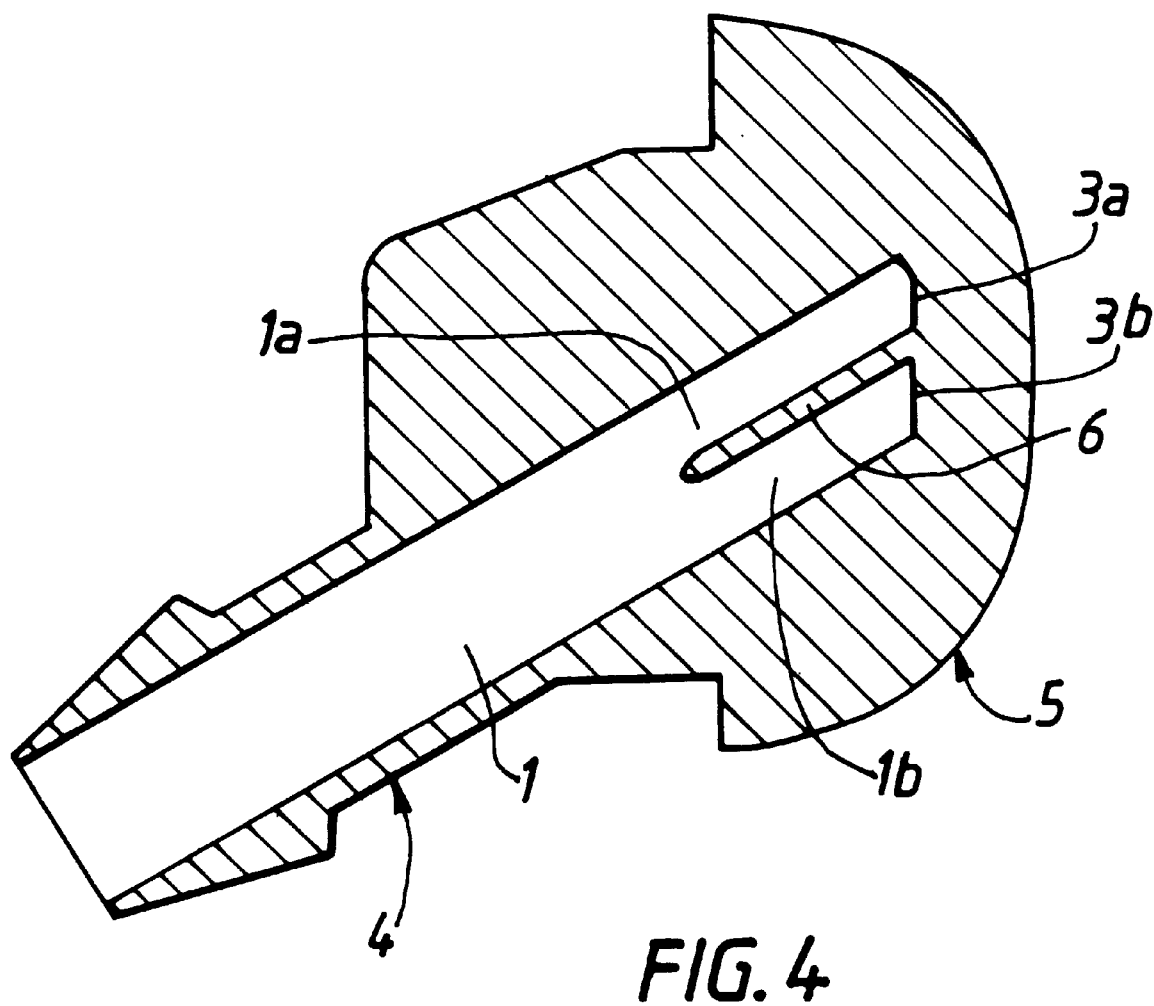
FIG. 4 is a longitudinal section through the nozzle shown in FIG. 3.

According to the invention, the nozzle further includes a partition 6 as shown in FIG. 4 and occupying at least a portion of the feed duct 1, adjacent to the outlet ducts 2a and 2b, so as to subdivide the feed duct 1 into two compartments 1a and 1b with respective communication holes 3a and 3b opening out into individual outlet ducts.

Thus, liquid coming from the inlet of the feed duct 1 remote from the communication holes 3a and 3b, is dispensed without turbulence, and therefore in more concentrated manner, into each of the compartments 1a and 1b, and thus into each of the outlet ducts 2a and 2b.

The end portion of the partition 6 remote from the communication holes 3a and 3b preferably tapers so as to improve flow.

In a preferred version, the partition 6 occupies a portion only of the feed duct 1, taking up about one-eighth of the length of the feed duct 1.

In a particular embodiment, as shown in FIG. 3, the feed duct 1 is of substantially constant inside section, the cross-sectional area of the duct being slightly smaller at the level of the partition than at its end.

In addition, the outlet ducts 2a and 2b are of substantially frustoconical shape.

In each of the ducts 2a and 2b, running from their respective communication holes 3a and 3b, there is a liquid-passing pipe 7a or 7b of substantially constant section and of diameter that is considerably smaller than that of the communication holes 3a and 3b.

Each liquid-passing pipe 7a and 7b has a respective ball 8 at its end adjacent to the communication hole 3a or 3b, enabling the pipe to be pointed in some particular direction.

The substantially frustoconical shape of the outlet ducts 2a and 2b enables the angle of the respective ball 8 to be adjusted.

Since liquid-passing pipes 7a and 7b provided with respective balls 8 are known in the prior art, they are not described in greater detail.

The diameter of such a pipe 7a or 7b is generally specified to be about 0.6 mm to 0.9 mm.

Finally, in order to calibrate the liquid jet and also to avoid making the nozzle fragile, and given the specified diameter for the pipes 7a and 7b, the diameter of the communication holes 3a and 3b should lie in the range about 1.5 mm to about 2 mm. A good compromise between these requirements leads to this diameter being about 1.8 mm.

Finally, as shown in FIG. 3, the nozzle also has fixing means 9a and 9b for fixing it to a portion of a vehicle.

Generally, the nozzle of the invention can be installed on the hood or the roof, the back door, or the grille of the vehicle cowl or scuttle.

Naturally, such a nozzle may be adapted to the fronts of vehicle headlights or to any other device that requires liquid to be dispensed in concentrated manner in predefined zones.

I claim:

1. A nozzle for dispensing a liquid jet, in particular for washing vehicle windscreens or headlight fronts, the nozzle comprising a feed duct for admitting therethrough one single liquid flow and at least two outlet ducts each communicating with the feed duct via a respective communication hole, at least one of the outlet ducts being inclined relative to the feed duct, and each of the feed duct and the outlet ducts being substantially rectilinear, a partition which subdivides the liquid flow into two separated liquid flows, said partition occupying at least a portion of the feed duct adjacent to the outlet ducts so as to subdivide the feed duct into two compartments and each compartment communicating with a respective communication hole, each separated liquid flow being dispensed uniformly through the respective communication hole into the respective outlet duct, the feed duct being of substantially constant inside section, with the cross-sectional area of the feed duct being slightly smaller at the level of the partition.

2. A nozzle according to claim 1, wherein an end portion of the partition remote from the communication holes tapers.

3. A nozzle according to claim 1, wherein the partition is situated in only a fraction of the feed duct.

4. A nozzle according to claim 3, wherein the partition occupies substantially one-eighth of the length of the feed duct.

5. A nozzle according to claim 1, wherein the diameter of each communication hole ranges between about 1.5 mm to about 2 mm.

6. A nozzle according to claim 5, wherein the diameter of each communication holes is about 1.8 mm.

7. A nozzle according to claim 1, wherein each of the outlet ducts contains a liquid-passing pipe running from its communication hole, the section of the pipe being substantially constant and its diameter being substantially smaller than the diameter of each communication hole.

8. A nozzle according to claim 1, further including means for fixing the nozzle to a portion of a vehicle.

* * * * *